June 8, 1943.  H. V. REED  2,321,513
FRICTION CLUTCH
Filed Aug. 30, 1940  2 Sheets-Sheet 1
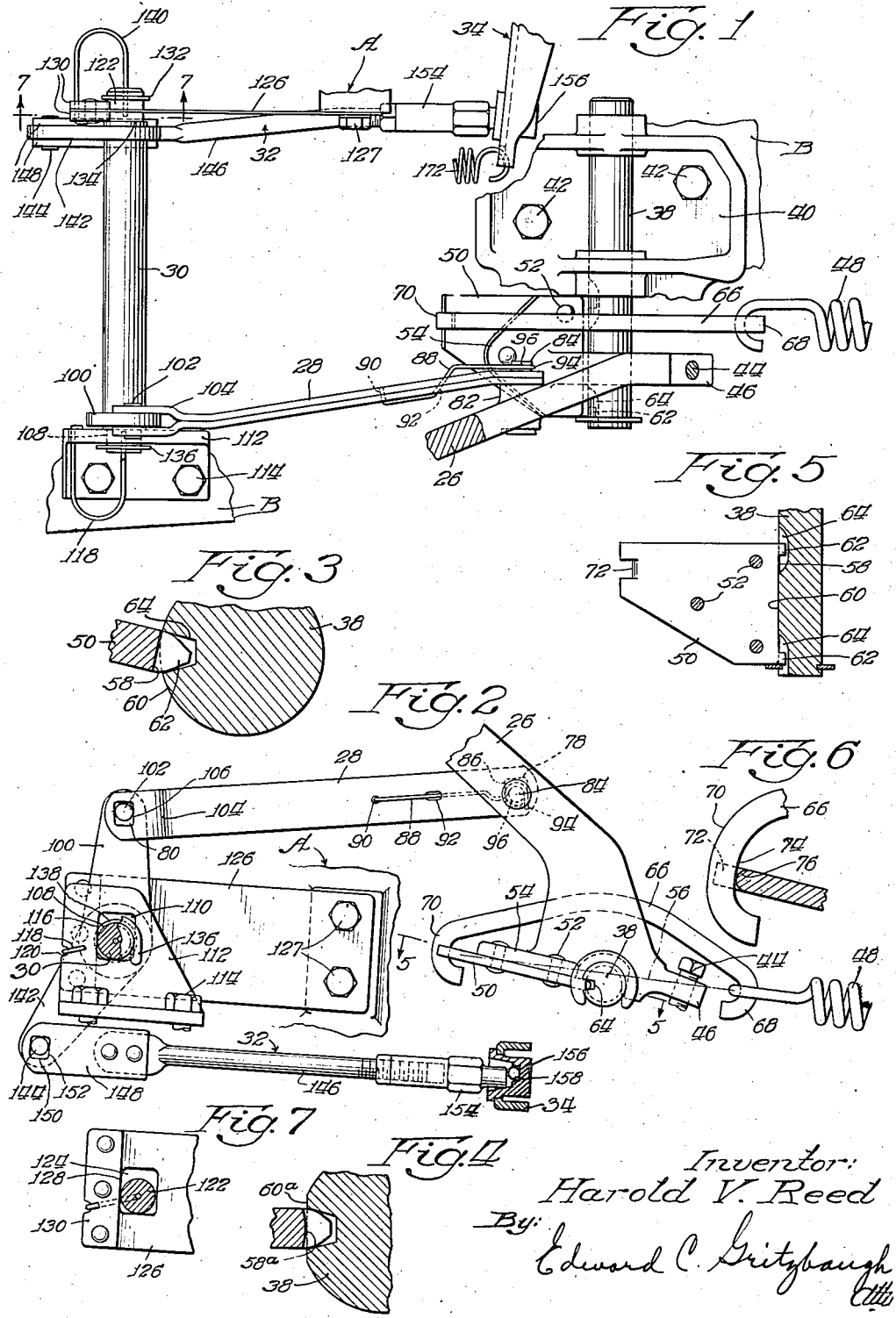
Inventor:
Harold V. Reed
By Edward C. Gritzbaugh
Atty.

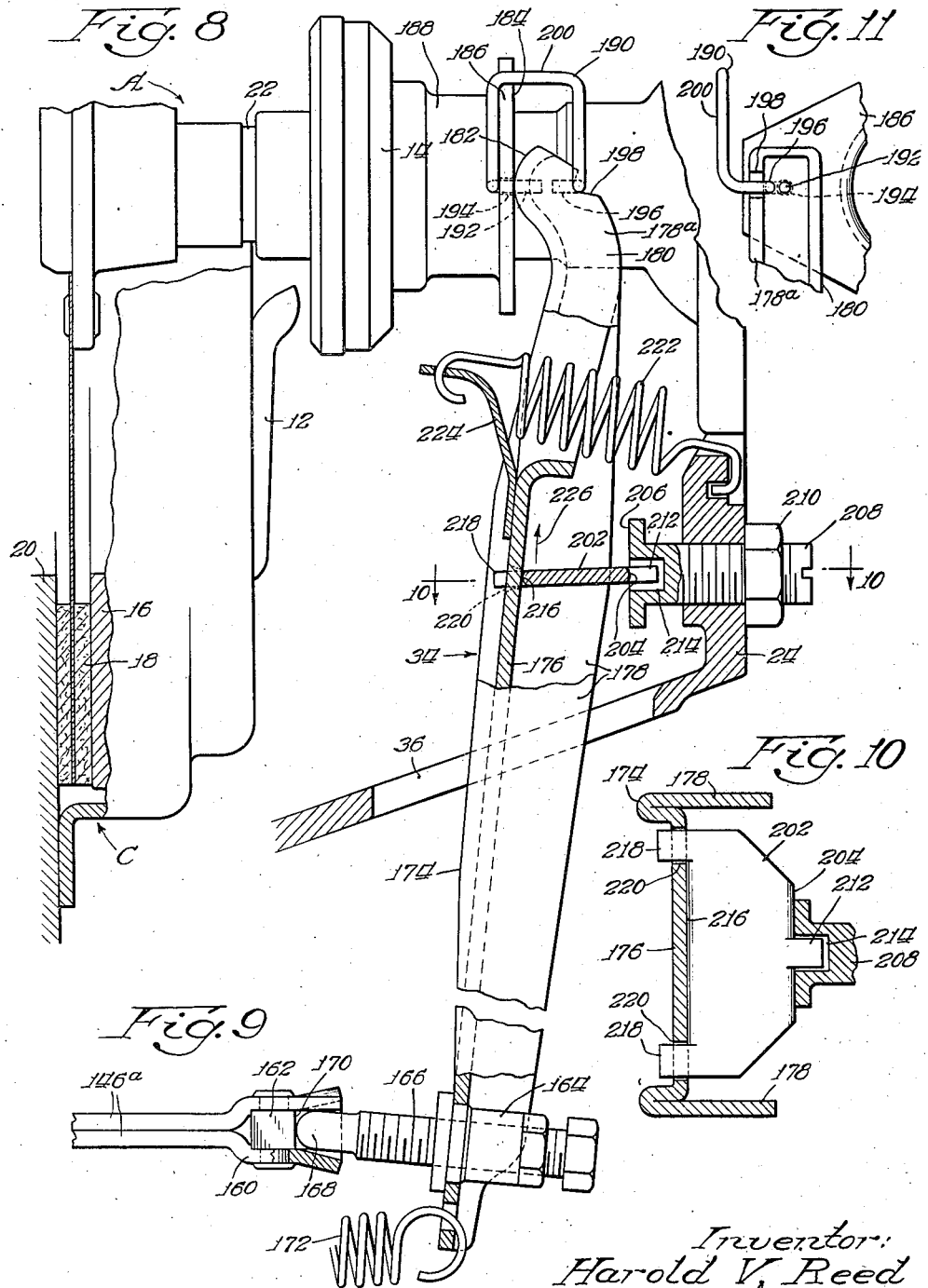

Patented June 8, 1943

2,321,513

UNITED STATES PATENT OFFICE 2,321,513

FRICTION CLUTCH

Harold V. Reed, Chicago, Ill., assignor to Borg-Warner Corporation, Chicago, Ill., a corporation of Illinois Application August 30, 1940, Serial No. 354,777

23 Claims. (Cl. 192—99)

This application includes subject matter disclosed in my prior application Serial No. 298,869, filed October 11, 1939, now Patent No. 2,250,394, issued July 22, 1941.

This invention relates to clutch operating mechanism for motor vehicles of the type wherein the drive mechanism, including the engine, clutch, transmission, etc. are provided with cushioned mounting in the frame and are therefore capable of a certain amount of movement relative to the frame during vehicle operation.

The general object of the invention is to provide, in such a vehicle, an improved clutch operating linkage of the type wherein operating movement is transferred from an operating member such as a pedal, carried by the frame, to the clutch through the medium of a relay shaft extending transversely between the frame and drive mechanism and having free pivotal movement with reference to each. The invention aims particularly to reduce the friction at all points throughout the linkage.

A further object of the invention is to provide a clutch operating linkage of the type specified, which embodies a booster spring for facilitating the clutch operating movement. Such a spring necessarily imposes considerable thrust upon the pedal fulcrum bearing or whatever member of the linkage the pull of the spring is applied to, and it is therefore a specific object of this invention to eliminate friction in this fulcrum bearing under the application of spring pull to the pedal, and at the same time to achieve a relatively simple, inexpensive and satisfactory pedal mounting construction.

Another specific object of the invention is to provide means for mounting the relay shaft for free pivotal movement at each end, such mounting being of such a character that in the oscillation of the shaft all sliding friction is eliminated and the bearing engagement between the shaft and the mounting means is purely a rolling engagement. This involves the mounting of the ends of the shaft in openings in the brackets by which it is supported, said openings being elongated so as to present substantially flat or straight bearing surfaces against which the shaft may roll. An incidental object of the invention in this connection is to provide means for yieldably maintaining the shaft in engagement with such flat bearing surfaces so as to eliminate rattling.

Another specific object of the invention is to provide connections between the crank arms of the relay shaft and the links connecting it to the pedal and to the operating yoke of the clutch respectively, in which connections sliding friction is eliminated and the bearing contact is purely a rolling contact.

Another object of the invention is to provide a simple but effective yieldable mounting for one end of the relay shaft, adapted to permit relative movement between the frame and the driving mechanism of the vehicle in any direction, including the direction of the axis of the relay shaft.

Another object of the invention is to provide means for yieldably maintaining the members of the rolling contact connections in proper position for assuring a true rolling contact and for preventing rattling.

Other objects, the advantages and uses of the invention will become more apparent after reading the following specification and claims, and after consideration of the drawings forming a part of the specification, wherein:

Fig. 1 is a plan view of a portion of a clutch operating mechanism embodying the invention;

Fig. 2 is a side elevation of the same, parts being shown in section to better illustrate the construction;

Fig. 3 is a detailed sectional view of the pedal fulcrum;

Fig. 4 is a detailed sectional view of a modified form of the pedal fulcrum;

Fig. 5 is a horizontal sectional view of the pedal fulcrum;

Fig. 6 is a detailed sectional view of the connection between the pedal strut and the booster spring yoke;

Fig. 7 is a detailed sectional view of the yieldable relay shaft bearing;

Fig. 8 is a plan view of the remainder of the clutch operating linkage;

Fig. 9 is a plan view partly in section of a modified form of the connection between the side entrance yoke of Fig. 8 and the push link which transmits movement thereto.

Fig. 10 is a detailed vertical section view of the side entrance yoke fulcrum taken as indicated by the line 10—10 of Figure 8; and Fig. 11 is a detailed elevation of portions of the yoke and thrust bearing.

As an example of one form in which the invention may be embodied, I have shown in the drawings a clutch operating mechanism forming part of a motor vehicle in which a driving mechanism, indicated generally at A is yieldably mounted in a frame, portions of which are indicated by the reference letter B. The driving mechanism A includes the friction clutch C having a plurality of levers 12 for transmitting clutch operating movement from a thrust bearing 14 to the pressure plate 16 for urging the latter away from the driven plate 18 against the action of conventional packing springs (not shown) incorporated in the clutch for clamping the driven plate against the flywheel 20 so as to transmit drive to the driven shaft 22 on which the thrust bearing 14 is slidably mounted. The mechanism just described is encased in a clutch housing 24 which is attached to the engine and forms a part of the drive mechanism assembly A.

Clutch operating movement is transmitted to the clutch C from an operator member 26 which in the particular form of the invention disclosed is a pedal adapted to be manipulated by the foot of the operator. From the pedal 26, clutch operating movement is transferred to a push link 28, thence to a relay shaft 30, thence to a push link 32 leading to a side entrance yoke 34 which extends through an opening 36 (Figure 8) in the side of the clutch housing 24 and transmits the movement to the thrust bearing 14.

The relay shaft 30 functions to transmit such operating movement from the pedal 26 which is mounted on one of the members of the frame B to the driving mechanism A while permitting relative movement between the driving mechanism and the frame.

The pedal 26 is fulcrumed upon a shaft 38 which in turn is mounted in a bracket 40 fixedly secured as by means of bolts 42 to the frame B. The fully retracted position of the pedal 26, shown in Figure 2, is determined by the engagement of a stop screw 44, adjustably threaded into a lug 46 on the heel of the pedal, against a suitable fixed member (not shown) which may be formed as part of the bracket 40 or may be a portion of the frame B.

A booster spring 48 applies a pull to a substantially radial arm at the toe of the pedal 26 in the form of a strut plate 50 secured as by rivets 52 to the toe portion 54. The line of pull of the spring, indicated at 56 lies above the fulcrum axis when the pedal is in its retracted position, and the spring thus serves to hold the pedal in this position. As the pedal is depressed, the line of pull of the spring will move below the fulcrum axis and the spring will then assist the operator in depressing the pedal, becoming more effective as the angle between the line of pull and the strut 50 gradually widens.

Since the full force of the spring 48 is applied to the pedal fulcrum on dead center, considerable difficulty has been experienced in this type of booster spring arrangement from the friction in the pedal fulcrum bearing. The invention eliminates this difficulty by providing a rolling contact bearing at the pedal fulcrum. To this end, the shaft 38 is rigidly mounted in the bracket 40 in a stationary position, and the pedal is fulcrumed against a portion of the shaft which projects from the bracket 40. The bearing engagement is between a flat bearing surface 58 on one extremity of the strut plate 50 and the cylindrical surface 60 of the shaft 38, as shown in Fig. 3. In a modified form of the invention shown in Fig. 4, the bearing surface of the strut is rounded as at 58a and the bearing surface of the shaft is flattened as at 60a.

In order to support the pedal with reference to the shaft, and to prevent lateral tilting of the pedal, the strut 50 is provided, on either side of the bearing surface 58, with a pair of teeth 62 which are received in recesses 64 in the shaft 38, the shape of the teeth and the recesses being such as to provide substantially constant clearance therebetween in the different angular positions of the pedal, at the surface 60.

The teeth 62 do not take any substantial portion of the spring load or the load transmitted through the linkage, and thus any incidental sliding contact between the surfaces of the teeth and recesses 64 will not introduce any objectionable friction in the operation of the mechanism. The engagement between the surfaces 58 and 60 is a true rolling engagement, completely eliminating sliding friction, and practically all of the load is taken on these surfaces.

The pull of the spring 48 is transmitted to the forward end of the strut plate 50 through the medium of a yoke 66 which is arched upwardly over the shaft 38 with sufficient clearance to accommodate the downward movement of the line of pull as the pedal is depressed. One end of the yoke 66 has a hook 68 engaging the spring 48 and the other end has a hook 70 which is received in a notch 72 in the strut 50 and has a substantially flat surface 74 engaged against a curved bearing surface 76 formed at the base of the notch 72. The bearing engagement between the surfaces 74 and 76 is a true rolling engagement. The pull of the spring 48 maintains the hook 70 in engagement in the notch 72.

The push link 28 has at each end a transversely elongated opening 78 and 80 respectively. Mounted in a boss 82 in the pedal 26 is a pin 84 which extends through the opening 78 and engages a flat surface 86 provided by one side of the opening. A spring 88, anchored in the push link 28 by being threaded through openings 90 and 92 therein has an end formed with a hook 94 which engages from above in an annular groove 96 in the end of the pin 84 and applies downward pressure to the latter so as to lift the push link 28 and maintain the bottom of the opening 78 in engagement with the pin 84. As the pedal is depressed, the pin 84 will roll upwardly with reference to the surface 86, eliminating all sliding friction. The spring 88 maintains the parts in the proper relationship to insure true rolling engagement.

Rigidly secured to one end of the relay shaft 30 is an upwardly projecting lever arm 100 in the upper end of which is rigidly mounted a pin 102 extending on both sides of the arm 100 and received in the openings 80 in the fork 104 forming the forward end of the push link 28. The pin 102 coacts with flat surfaces 106 defining one side of the openings 80. In the inoperative position of the linkage, the push link 28 rests by gravity on the pins 102 with the latter in contact with the upper extremities of the openings 80. Thus the parts are maintained in proper relationship so that during pedal depression the pin 102 will roll downwardly against the surfaces 106 with a true rolling motion.

The outer end of the shaft 30 projecting beyond the arm 100 has a reduced neck portion 108 extending through a vertically elongated opening 110 in a bracket 112 secured as by cap screws 114 to a frame member B. The neck portion 108 of the shaft normally rests against the bottom of the opening 110 in engagement with a flat bearing surface 116, defining one side of the opening 110, and rolls upwardly against the surface 116 during pedal depression. Thus a true rolling movement is achieved at this region of the linkage. A spring 118, having one end hooked into a notch 120 in the bracket 112 and its other end piloted in an opening in the end of the shaft 30, yieldingly maintains the engagement between the shaft and the surface 116 and avoids rattling.

The inner end of the shaft 30 is formed with a reduced neck portion 122 which is received through a vertically elongated opening 124 (Fig. 7) in the free end of a bracket comprising a strip of thin resilient sheet metal 126 secured as by cap screws 127 to a portion of the housing mechanism of the drive assembly. The neck portion 122 normally rests in the bottom of the opening 124 and engages bearing surfaces 128 formed along one side of the opening 124 by a pair of bars 130 riveted on the respective sides of the strip 126. The neck portion 122 is maintained in engagement with the flat bearing surfaces 128 by a spring 140 similar to the spring 118, and normally rests in the bottom of the opening 124 so as to roll upwardly against the surfaces 128 during pedal depression and thus achieve a true rolling motion.

The bars 130 are embraced between and coact with a spring clip 132 mounted in a groove in the end of the neck portion 122 and with a shoulder 134 defined by the shaft 30 at the base of the neck portion 122, so as to locate the shaft 30 and the resilient bracket 126 against relative movement in the direction of the shaft axis. However, the shaft is permitted to move axially with reference to the drive unit, by flexing of the bracket 126. The outer end of the shaft will move with the frame B, being confined against axial movement in the bracket 112 by a clip 136 and a shoulder 138 (Fig. 2) defined by the shaft 30 at the base of the neck portion 108.

While the bracket 126 may flex freely in the direction of the axis of the shaft 30, it is relatively inflexible vertically, having sufficient width to adequately support the weight of the linkage carried by it. The fulcrum reaction of the shaft 30 against the bracket 126 is taken by the latter in tension. Thus the bracket provides a fulcrum which is rigid for the purpose of providing bearing support, i. e., takes the fulcrum reaction without yielding thereunder.

It may be noted at this point that the relay shaft 30, although unyieldingly fulcrumed with respect to both frame and drive mechanism has universal freedom of movement such as to allow the frame and drive mechanism to move relative to each other either in a horizontal transverse direction (parallel to the shaft 30) or vertically or longitudinally. The latter movements are permitted by the free pivoting of the neck regions 108 and 122 respectively in the openings 110 and 124 respectively.

On the inner end of the shaft 30 is fixedly secured a crank arm 142 which projects downwardly and carries at its lower end a rigid transversely extending pin 144. The push link 32 includes a rod 146 having at one end a fork 148 embracing the arm 142 and provided in its respective furcations with vertically elongated openings 150 receiving the pin 144. The push link 32 is normally supported with the upper extremities of the openings 150 in contact with the pin 144 whereby the parts are properly positioned so that during pedal depression the pin 144 may roll downwardly against the bearing surfaces 152 presented by the sides of the opening 150, thus giving a true rolling contact.

On the other end of the push rod 146 is adjustably threaded a bearing pin 154 which extends into a socket element 156 mounted in the end of the side entrance yoke 34, and bears against a ball 158 mounted in the base of the socket 156.

In a modified form of the bearing connection between the push rod 146 and the side entrance yoke, shown in Fig. 9, the push rod is formed of two strips 146a which are spread apart at their rear ends to form a socket 160 the sides of which are secured together by a rivet 162. In the end of the side entrance yoke 34 is pressed an internally threaded sleeve 164 in which is adjustably threaded a push pin 166. The end of the pin 166 has a spherical bearing surface 168 which engages a flat bearing surface 170 presented by one side of the rivet 162, the latter being square in cross-section.

A spring 172, one end of which is suitably anchored as for example to the shaft 30, has its other end attached to and acting in tension against the outer end of the side entrance yoke 34 so as to maintain the contact between the bearing surfaces 168 and 170.

The yoke 34 includes the lever portion 174 which is channel-shaped in cross-section as shown in Figure 10, including a central web portion 176 and side walls 178. The other end of the yoke is in the form of a fork having two spaced furcations 180 the ends of which are formed with cylindrical bearing surfaces 182 in rolling bearing engagement with a flat bearing surface 184 presented by a flange 186 formed on the sleeve portion 188 of the thrust bearing 14. The furcations 180 are maintained in contact with the flange 186 by a pair of spring clips 190 each including a prong 192 fixed in the bearing region of a respective furcation 180 and extending with clearance through an opening 194 in the flange 186, an opposite end portion in the form of a hook 196 engaged in a notch 198 in the side wall 178a of the furcation 180, and an intermediate yoke portion 200 which yieldingly urges the hook 196 and the prong 192 toward each other. The prong 192 functions to locate the ends of the furcations 180 with reference to the surface 184, the openings 194 being large enough, however, to permit the furcations to rock back and forth with reference to the flange 186 maintaining true rolling bearing engagement between the surfaces 182 and 184.

Such true rolling movement is made possible by fulcruming the intermediate region of the lever against a tilting fulcrum strut 202, one extremity of which has a pair of rounded shoulders 204 in rocking bearing engagement with a flat bearing surface 206 formed on the end of an abutment element 208 adjustably threaded into the end wall of the housing 24 and secured by a lock nut 210. Between the shoulders 204 there is formed on the strut 202 a teet 212 which pilots in a cavity 214 in the abutment element 208.

The opposite extremity of the fulcrum strut 202 is formed with a rounded bearing edge 216 in rocking bearing engagement with the web 176 of the yoke 34. On either side of the bearing edge 216 there is formed a teet 218 which pilots in an opening 220 in the web 176.

A spring 222, extending between the furcations 180 acts in tension against the forked end of the yoke 34 so as to normally move such end away from the clutch and with it the bearing 14. The spring 222 maintains the yoke constantly in engagement with the fulcrum strut 202. One end of the spring is hooked into the casing 24 and the other end is attached to a bracket 224 secured to the yoke 34.

As the clutch pedal is depressed, moving downwardly in a counterclockwise direction as viewed in Fig. 2, the push link 28, moving toward the left, will transmit movement to the relay shaft 30, rocking the latter in a counterclockwise direction, and the push link 146, moving toward the right as viewed in Fig. 2, will rock the yoke 34 in a counterclockwise direction as viewed in Fig. 8, so as to move the bearing 14 against the clutch levers 12 for releasing the clutch. As the yoke 34 thus swings in a counterclockwise direction, the bearing ends of the furcations 180 will rock against the bearing surface 184 of the thrust bearing without sliding friction, and the fulcrum strut 202 will swing in a clockwise direction as indicated by the arrow 226, so as to permit the furcations 180 to remain in non-slipping bearing engagement with the surface 184.

The push rod 146 or 146a as the case may be, is free to swing laterally so as to follow the bodily movement of the yoke 34 in the direction indicated by the arrow 226, thus avoiding any sliding friction between the surfaces 168 and 170 as a result of such movement. The pin and socket connection at this point prevents any lateral displacement of the push rod with reference to the yoke.

The side entrance yoke arrangement as shown in Figs. 8, 10 and 11 is similar to that disclosed in my application Serial No. 298,869, now Patent No. 2,250,394, issued July 22, 1941, the chief difference being that in the present invention, the yoke functions only for transmitting releasing movement to the clutch, whereas in the prior application, the yoke functions also to transmit packing pressure to the clutch from an external source of packing pressure.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a vehicle including a frame and a drive mechanism yieldably mounted therein and including a clutch; a relay shaft extending transversely between the frame and the drive mechanism and adapted to transmit clutch release movement from a clutch operator member toward said clutch, and a bracket in which an end of said shaft is fulcrumed, said bracket being provided with a bearing opening one side of which presents a bearing surface substantially normal to the direction of fulcrum reaction of said shaft against said bracket, said shaft having a portion, smaller than said opening, extending through said opening and adapted to roll against said bearing surface during clutch operating movement.

2. In a vehicle including a frame and a drive mechanism yieldably mounted therein and including a clutch; a clutch operating pedal fulcrumed with reference to the frame, a relay shaft extending transversely between the frame and the drive mechanism and adapted to transmit clutch operating movement from said pedal toward said clutch, a pair of brackets carried by said frame and drive mechanism respectively, each of said brackets being provided with an opening a side of which presents a substantially flat bearing surface substantially normal to the direction of fulcrum reaction of said shaft, the respective end regions of said shaft being smaller than and extending through said openings, normally supported in the bottoms of said openings, and adapted to roll upwardly against said substantially flat bearing surfaces and to fulcrum thereagainst during clutch operation.

3. In a motor vehicle having a frame and a drive mechanism including a clutch; a transverse relay shaft for transferring clutch operating movement from an operator member toward the clutch, brackets carried by the frame and drive mechanism, each having a vertically elongated opening in which a respective end of said shaft is received for free pivotal movement permitting relative movement between said frame and drive mechanism, said shaft normally resting in the bottoms of said openings, said openings having side regions presenting relative straight bearing surfaces against which said shaft end regions are adapted to roll upwardly during clutch operating movement.

4. Clutch operating mechanism as defined in the preceding claim, including resilient means acting between said shaft end regions and said brackets for maintaining said shaft end regions in constant contact with said straight bearing surfaces, to avoid rattling.

5. A clutch mechanism as defined in claim 3, including U-shaped spring elements each having one end anchored in a respective end of said shaft and its other end engaging said bracket so as to yieldingly urge said shaft end regions constantly into contact with said straight bearing surfaces.

6. In a motor vehicle having a frame assembly and a drive assembly yieldably mounted therein and including a clutch; a clutch operating pedal fulcrumed with reference to the frame assembly, a relay shaft extending transversely between the frame assembly and the drive assembly and adapted to transmit clutch operating movement from said pedal to said clutch, and bracket means carried respectively by said frame and drive assemblies, and having openings in which the respective end portions of said shaft are supported and fulcrumed for free pivotal movement allowing said assemblies to move relatively, one of said bracket means comprising a length of thin resilient sheet metal one end of which is fixedly attached to the assembly by which it is supported and the other end of which is provided with one of said openings, said openings each having a substantially straight side, substantially normal to the direction of fulcrum reaction of said shaft, said shaft and portions being smaller than said openings, extending through said openings, and being adapted to make rolling contact with said substantially straight sides thereof and to fulcrum thereagainst during clutch operation.

7. Clutch operating linkage including a shaft adapted to transmit clutch operating movement toward a clutch, a crank member on said shaft, and a link member for transferring movement to said crank member from an operator element, one of said members having a rigidly mounted pin extending parallel to the axes of the pedal fulcrum and said shaft respectively and the other of said members having an opening larger than said pin and receiving the same, said opening having a side presenting a substantially flat bearing surface, substantially normal to the direction of transmission of movement between said members, against which said pin is adapted to make rolling contact during clutch operation.

8. In a motor vehicle having a frame and a drive mechanism yieldably mounted therein and including a clutch, a transverse relay shaft extending between and pivotally mounted at its respective ends with reference to said frame and said drive mechanism so as to permit relative movement therebetween, means for applying clutch operating movement to the outer end of said shaft, an arm member carried by the inner end of said shaft for transferring the movement toward the clutch, a link member for receiving the movement from said arm, one of said members having an opening and the other of said members having a rigid pin, parallel to the axis of the shaft, smaller than said opening and extending therethrough, one side of said opening defining a relatively straight bearing surface against which said pin is adapted to make rolling contact during clutch operation.

9. In a motor vehicle having a frame and a drive mechanism including a clutch, a transverse relay shaft for transmitting clutch operating movement toward the clutch, said shaft having its respective ends pivotally mounted with reference to the frame and said drive mechanism so as to permit relative movement therebetween, means for applying clutch operating movement to the outer end of said shaft, an arm rigidly attached to and depending from the inner end of said shaft, said arm having at its end a rigid pin parallel to the shaft axis, and a link for transferring the movement from said arm toward the clutch, said link having at one end a vertically elongated opening receiving said pin and being supported at said end by contact of the pin with the top of the opening, one side of said opening presenting a relatively straight bearing surface against which said pin is adapted to roll downwardly during clutch operation.

10. In a clutch operating mechanism, a clutch operating pedal, linkage for transferring clutch operating movement from said pedal to a clutch, said linkage including a link extending in a substantially horizontal direction from said clutch pedal, a pin rigidly mounted in said pedal and extending parallel to the fulcrum axis thereof, said link having an opening one side of which presents a substantially straight bearing surface substantially normal to the direction of transmission of movement from said pedal to said link, said pin being adapted to fulcrum against said bearing surface during clutch operation, and a spring acting between said pin and said link and adapted to yieldingly support the said link with the lower extremity of said opening in contact with said pin, whereby to permit a true rolling engagement between said pin and said bearing surface during clutch operation.

11. In a motor vehicle having a frame member, a substantially horizontal transverse clutch pedal fulcrum shaft rigidly mounted therein, a clutch pedal having its lower end loosely embracing and fulcrumed for rolling engagement with said shaft and a booster spring acting against said pedal so as to facilitate clutch operating movement of said pedal in an advanced stage thereof and also to maintain the pedal in proper fulcruming relationship to said shaft.

12. In a motor vehicle having a rigidly mounted clutch pedal fulcrum member, a clutch pedal, said pedal and fulcrum member having interengaging portions disposed along the axis of pedal movement whereby said pedal is fulcrumed against said member in rolling contact therewith and prevented from tilting laterally, and a booster spring acting against said pedal so as to facilitate clutch operating movement of said pedal in an advanced stage thereof and also to maintain said interengaging relationship.

13. In a motor vehicle including a rigidly mounted transverse substantial horizontal pedal fulcrum member, a clutch operating pedal having in its lower region a strut plate fulcrumed against said member in rolling contact therewith, said member and the extremity of said plate being formed with portions interengaging so as to support the pedal and prevent lateral tilting thereof while permitting fulcruming movement, and means yieldably engaging the opposite extremity of said plate and maintaining said interengaging relationship.

14. In a motor vehicle, a rigidly mounted substantially horizontal transverse pedal fulcrum shaft, said shaft being provided with horizonatlly aligned recesses, and a pedal having its lower region formed with a pair of spaced horizontally aligned teeth received in said recesses and adapted to support the pedal and to prevent lateral tilting thereof, said lower region being formed intermediate said teeth with a projecting, horizontally extending edge region having fulcruming bearing engagement with a lateral surface of said shaft intermediate said recesses.

15. In a motor vehicle having a frame and a drive mechanism including a clutch, a clutch operating pedal, a transverse support on which said pedal is fulcrumed with reference to the frame, said pedal having at its lower end a strut member one extremity of which has rolling bearing engagement with said support and the other extremity of which is formed with a notch the bottom of which presents a bearing surface, said other extremity extending in a generally radial direction on one side of the fulcrum axis, a booster spring arranged on the other side of the fulcrum axis, having one end anchored to the frame, and means for transferring pull from the other end of said spring to strut member, said means including a portion received in said notch and formed with a bearing surface adapted to have rocking contact with said strut bearing surface during clutch operation.

16. In a motor vehicle having a frame and drive mechanism including a clutch, clutch operating mechanism including a pedal fulcrumed in said frame on a transverse axis, said pedal having at its lower end a strut member projecting in a generally radial direction from the fulcrum axis, said strut member being formed at its outer end with spaced extremities defining between them a notch, and at the bottom of said notch, a rounded bearing surface, a booster spring arranged on the opposite side of the fulcrum axis, having its remote end anchored to the frame, and means for applying pull from the other end of said spring to said strut so as to facilitate clutch operation during an advanced stage of pedal movement, said means having a portion received in said notch and formed with a relatively straight bearing surface adapted to engage said rounded bearing surface with a rolling movement during clutch operation.

17. Clutch operation mechanism as defined in claim 15, wherein said last means comprises a yoke having at one end a hook which is received in said notch and is in bearing engagement with said strut bearing surface and at its other end a connection to said spring, the intermediate region of said yoke being arched over said support member and normally spaced thereabove.

18. In a motor vehicle clutch including a plurality of levers, a bearing for transmitting thrust to said levers for operating the clutch, said bearing at its extremity opposite said levers presenting a flat radial bearing surface, a lever having furcations presenting cylindrical bearing surfaces in contact with said radial bearing surface, means providing an abutment surface, and a fulcrum strut interposed between an intermediate region of said lever and said abutment surface, said strut being adapted to tilt to permit longitudinal movement of said lever during clutch operation so as to allow said cylindrical bearing surfaces to maintain true rolling contact with said radial bearing surface.

19. In a motor vehicle including a clutch having levers, a bearing for transmitting thrust to said levers for operating the clutch, said bearing at its extremity opposite said levers presenting a flat radial bearing surface, a housing in which said clutch and bearing are encased, a lever extending through an opening in the side wall of said housing and having furcations presenting cylindrical bearing surfaces in contact with said radial bearing surface, an abutment member adjustably mounted in an end wall of said housing, and presenting toward said lever a cavity and a bearing surface on either side of said cavity, and a fulcrum strut having at one end a bearing engagement with said lever and at its other end a bearing engagement with said bearing surface of the abutment member and having, at said other end, a teet extending into said cavity, said strut being arranged to swing during clutch operation so as to permit longitudinal movement of said lever allowing said cylindrical bearing surfaces to maintain true rolling contact with said radial bearing surface.

20. In a motor vehicle including a clutch having levers, a bearing for transmitting thrust to said levers for operating the clutch, said bearing at its extremity opposite said levers having a radial flange, a lever having furcations presenting cylindrical bearing surfaces in contact with said radial flange, means providing an abutment surface, a fulcrum strut having a bearing engagement at one end with said lever and at its other end with said abutment surface, said strut being arranged to swing during clutch operation so as to permit longitudinal movement of said lever allowing said cylindrical bearing surfaces to maintain true rolling engagement with said radial bearing surface, and a spring clip embracing and yieldably maintaining contact between a respective furcation and said flange, said clip having an end extended through said flange and furcation so as to provide a piloting connection therebetween.

21. In a motor vehicle including a clutch having levers, a bearing for transmitting thrust to said levers for operating the clutch, said bearing at its extremity opposite said levers having a radial flange, a lever having furcations presenting cylindrical bearing surfaces in contact with said radial flange, means on which said lever is fulcrumed so as to permit longitudinal movement of said lever allowing said cylindrical bearing surfaces to maintain true rolling engagement with said radial bearing surface, and a spring clip embracing and yieldably maintaining contact between a respective furcation and said flange, said clip having an end extended through said flange and furcation so as to provide a piloting connection therebetween.

22. Mechanism for transferring clutch-operating movement to a clutch, comprising a pivoted lever member and a link member, one of said members having a rigid pin extending parallel to the fulcrum axis of said lever member and the other of said members having an opening, larger than said pin, one side of which presents a substantially straight bearing surface substantially normal to the direction of transmission of movement between said members, said pin extending through said opening and being normally in contact with the upper extremity thereof so as to support the member having the opening, said members being arranged to pivot relative to each other during clutch operation in relative directions such that said pin will roll downwardly against said bearing surface while fulcruming thereagainst in the transmission of clutch-operating movement.

23. Mechanism for transferring clutch-operating movement to a clutch, said mechanism including a pivoted lever member and a link member, one of said members having a rigid pin extending parallel to the pivotal axis of said lever member and the other of said members having an opening, larger than said pin, one side of which presents a substantially straight bearing surface substantially normal to the direction of transmission of movement between said members, a spring attached to the member having said opening and engaging said pin to yieldingly support said last-mentioned member with the lower extremity of said opening in contact with the lower side of said pin, said spring being adapted to yield so as to permit said pin to roll upwardly with reference to said straight bearing surface while fulcruming against said bearing surface during clutch operation.

HAROLD V. REED.